STEREO PILOT CHAIN CONTROL TRANSISTOR CIRCUIT
Filed Sept. 24, 1964
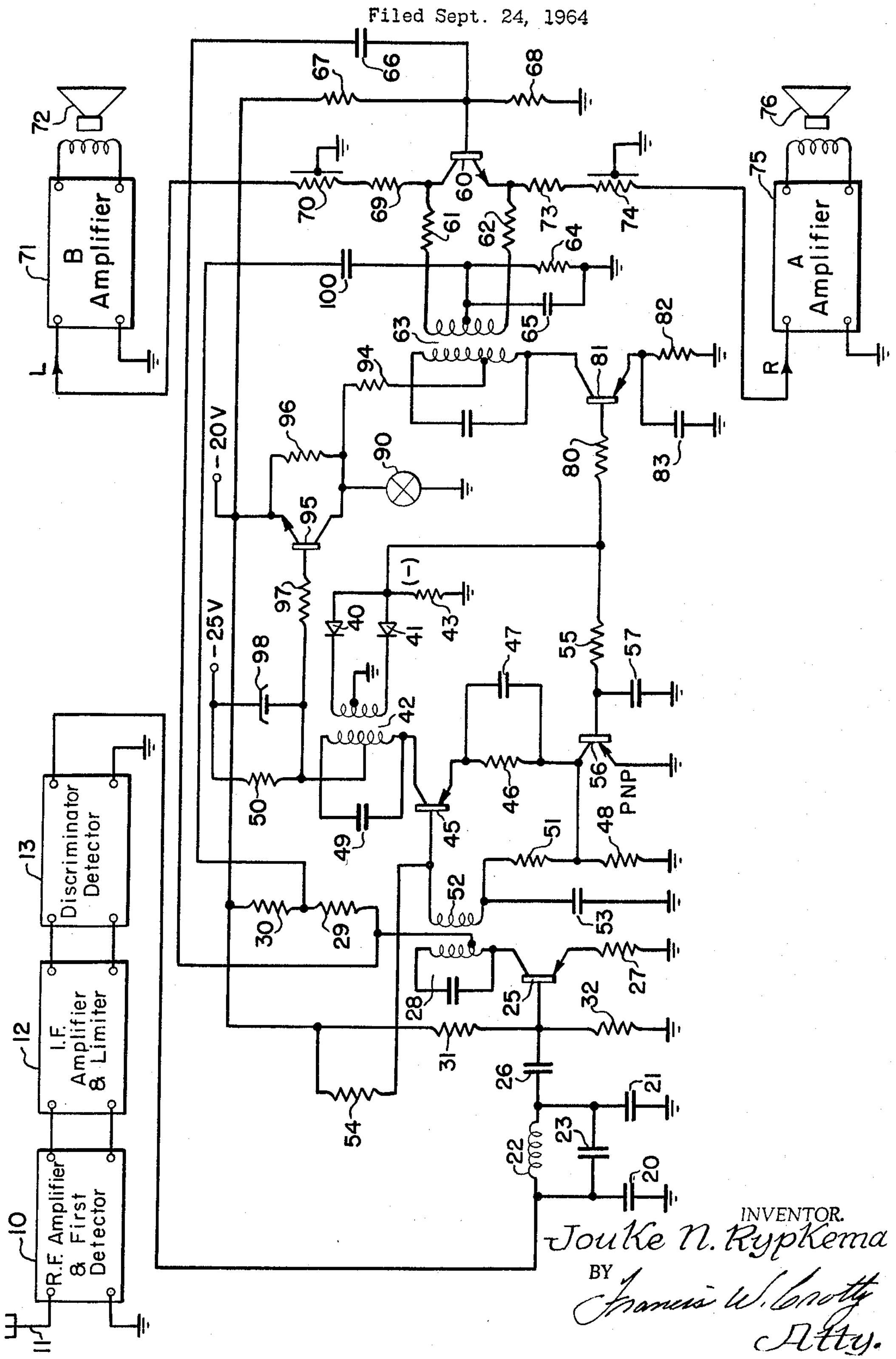
INVENTOR.
Jouke N. Rypkema
BY
Francis W. Crotty
Atty.

3,286,034
STEREO PILOT CHAIN CONTROL TRANSISTOR CIRCUIT

Jouke N. Rypkema, Villa Park, Ill., assignor to Zenith Radio Corporation, Chicago, Ill., a corporation of Delaware Filed Sept. 24, 1964, Ser. No. 398,949
8 Claims. (Cl. 179—15)

The present invention concerns a frequency modulation receiver of the type which may respond to a monaural signal or to a stereophonic signal of the specification recently adopted by the Federal Communications Commission. The invention addresses itself most particularly to the portion of such a receiver that is referred to as a "pilot-tone chain."

Viewed from the standpoint of a monaural receiver, an instrument of the type under consideration is functionally no different than a conventional FM receiver because during monophonic reception those components added to the receiver to accommodate stereophonic reproduction are inactive. Consequently, the structural departure of this instrument from the ordinary FM receiver is in those components required for stereo reproduction.

In accordance with current standards of the Federal Communications Commission, an FM stereophonic broadcast comprises a carrier signal that has been subjected to complex modulation. One of the terms of its modulation function represents the sum of the two audio signals required to produce a stereo effect; for convenience, this will be represented as the sum or $(A+B)$ term of the modulation function. Another term of the modulation function is a subcarrier that has been suppressed-carrier amplitude-modulated by the difference information of the same two audio signals; this is referred to as the difference or $(A-B)S$ term, where S represents a subcarrier signal. The final term of the modulation function is a pilot tone, a signal at one-half the frequency of the modulated subcarrier. It is used to reconstruct the fundamental of the subcarrier at the receiver in order to demodulate and derive the difference or $(A-B)$ information.

A number of multi-mode receivers have been proposed for utilizing monophonic and stereophonic broadcasts.

One, which is a forerunner of the receiver to be described, is the subject of an application Serial No. 118,009, filed June 19, 1961, in the name of Adrian J. De Vries, and assigned to the assignee of the present invention. It has a pilot-tone chain comprising an amplifier tuned to the pilot component of the stereophonic broadcast, a frequency doubler for multiplying the pilot tone to derive a demodulation signal and a synchronous detector which responds to the demodulation signal and the output signal of the first FM detector since the output of that detector represents the modulation function of the stereophonic program signal. The De Vries receiver has performed most satisfactorily but it features vacuum tubes in the pilot-tone chain. There is, of course, a strong trend to transistorizing home instruments of this type and the subject invention pertains particularly to transistorizing the pilot-tone chain while retaining the desirable characteristics of the tube version.

A first approach to transistorizing the pilot chain is described and claimed in De Vries Patent 3,129,288, issued April 14, 1964, and assigned to the assignee of the present invention. It has the same general complement of components constituting the pilot-tone chain but utilizes transistors in place of vacuum tubes. The pilot tone amplifier of the pilot chain normally functions at low gain because it is desirable to have the pilot chain quiescent in the presence of a monaural signal. A feedback is provided from the output of the frequency doubler to the base electrode of a transistor included in the pilot tone amplifier to increase the base current of this transistor during the reception of a stereophonic signal and increase the gain of the pilot chain at such times. This is a desirable feature but it is found that this transistorized pilot chain does not exhibit the selectivity and gain characteristics that are readily attainable with the vacuum tube version. This follows from the fact that the emitter circuit of the coupling transistor in the De Vries patent has a fixed impedance which constitutes a constant load on the driving or input amplifier. It is desirable to modify the arrangement to the end that the pilot chain exhibits highest selectivity and low gain in the absence of a received stereophonic program and high gain, even at some sacrifice in selectivity, during stereophonic reception.

The need for high selectivity during monaural reception will be appreciated when it is recognized that the pilot tone of the stereophonic program may be very close, frequencywise, to a tone employed in subscription FM broadcasting to suppress commercials from reproduction in subscriber installations. Actually, the pilot tone is at 19 kc. and the control tone in the subscription system may be as low as 20 kc. Since the pilot chain is to be activated only in the presence of stereo, the need for high selectivity in the absence of a stereo program is evident.

Accordingly, it is an object of the invention to provide an improved transistorized pilot-tone chain for a frequency modulation receiver that may respond to monaural or stereophonic signals.

It is another particular object of the invention to provide a pilot-tone chain for such a receiver which has improved selectivity characteristics.

It is a further specific object of the invention to provide a transistorized pilot-tone chain for such receiver which exhibits maximum selectivity and low gain in the absence of a stereophonic broadcast but high gain in the reception of such a broadcast.

A frequency modulation receiver for utilizing a monaural or a stereophonic signal, constructed in accordance with the invention, features a pilot-tone chain to respond to the pilot-tone characteristically included in the stereophonic broadcast. The pilot chain comprises an input amplifier tuned to the pilot tone and a signal source responsive to the pilot tone for deriving a signal for demodulating the stereophonic signal. A variable gain transistor amplifier having an emitter circuit couples the demodulation signal source to the input amplifier. There is a high impedance in the emitter circuit of the variable gain amplifier which establishes a low gain quiescent operating condition for that amplifier in the presence of a monaural signal or in the absence of a stereophonic signal. A feedback circuit couples the demodulation signal source to the input of the variable gain amplifier and constitutes therewith a regenerative circuit. There are means in the feedback circuit, responsive to translation of the pilot tone, for effectively reducing the impedance of the emitter circuit to change the operating condition of the variable gain amplifier from its low gain quiescent state to a condition of high gain in the presence of a stereophonic signal.

In one aspect of the invention, a transistor is included in the feedback circuit having collector and emitter electrodes directly coupled across the high impedance which normally constitutes the emitter load of the variable gain amplifier. This further transistor is normally non-conductive but is driven to saturation by the response of the demodulation signal source to the pilot tone of a received stereophonic program. As a consequence, the high emitter impedance of the variable gain transistor amplifier is effectively replaced by the low impedance of the collector-emitter circuit of this further transistor and the change in impedance occasions the desired change in gain.

The foregoing and other objects of the invention which are believed to be novel are set forth with particularity in the appended claims. The organization and manner of operation of the invention, together with further objects and advantages thereof, may best be understood by reference to the following description taken in connection with the accompanying drawing, the single figure of which is a schematic representation of a frequency modulation receiver including a pilot-tone chain embodying the invention.

Except for the pilot-tone chain, the receiver of FIGURE 1 is similar to that disclosed and claimed in De Vries Patent 3,129,288. Both operate in response to the same type of signals and each is a multi-mode receiver which automatically adjusts itself to accommodate the character of the signal instantaneously received. Details of the signal specifications and the conversion as between operating modes are disclosed in the De Vries patent and need not be repeated.

The receiver includes a radio-frequency amplifier of any desired number of stages and a heterodyning stage or first detector all of which are represented by block 10. The input of this unit connects with an antenna system 11 and its output is coupled to a unit 12 which includes stages of intermediate-frequency amplification and one or more amplitude limiters. Following amplifier and limiter 12 is a frequency modulation detector 13 responsive to the amplitude limited intermediate-frequency signal for developing a composite signal representing the modulation of the received carrier.

Detector 13 is coupled to a pilot-tone chain through a trap circuit having shunt capacitors 20, 21 and a series arm comprised of an inductor 22 in parallel with a capacitor 23. The components of this trap are selected to reject a carrier frequency of 67 kc. over which services other than FM entertainment may be conducted. For example, storecasting may be accommodated at that frequency because the FM stereo standards currently in force have such flexibility. So long as the receiving circuits have suitable protection, multiplexing of this additional service with the broadcast programs is entirely feasible.

The trap couples detector 13 to an input amplifier including a transistor 25. The base electrode connects with the output of the trap through a coupling condenser 26. The emitter of the transistor is returned to ground through a resistor 27 and the collector circuit comprises a load impedance 28 which is tuned to the pilot tone of a stereophonic broadcast in series with resistors 29 and 30 which lead to a potential supply designated —20 v. There is a voltage divider of resistors 31 and 32 extending from source —20 v. to ground and the base of transistor 25 connects with the junction of these resistors.

Since the difference information of the stereophonic program is conveyed by way of suppressed-carrier amplitude modulation, it is necessary to reconstruct the carrier component at the receiver and, therefore, the pilot chain has a signal source which is responsive to the pilot tone of a received stereo program for deriving a demodulation signal. As shown, this source is a frequency doubler comprising a pair of diodes 40, 41 the cathodes of which couple to the opposite terminals of the secondary winding of a transformer 42. The center tap of the secondary winding is grounded and the anodes of the diodes connect to ground through a load resistor 43. Since the demodulation signal source is a frequency doubler of the full-wave rectifier type, the amplitude of the demodulation signal is determined by and varies with the amplitude of the pilot tone as applied to the doubler until such time as limiting occurs in an amplifier 45 as explained hereinafter.

The frequency doubler is driven by the pilot tone through a transistor amplifier 45 of the variable gain type which couples the frequency doubler or demodulation signal source to input amplifier 25. The emitter circuit of amplifier 45 includes a low resistance 46 by-passed at the pilot frequency by a capacitor 47 and coupled to ground through a high impedance shown as a resistor 48. The collector circuit of transistor 45 includes the primary of transformer 42 tuned to the pilot tone by a condenser 49 and connected through a resistor 50 to a source of operating potential designated —25 v. The emitter-base circuit of transistor 45 includes, in addition to resistor 46, a resistor 51 in series with an inductor 52 which is inductively coupled to tuned impedance 28 of amplifier 25. Actually, coils 28 and 52 constitute primary and secondary windings of a transformer. The junction of resistor 51 with coil 52 is by-passed at the pilot frequency by a capacitor 53 and these components, in shunt relation with resistor 48, comprise the quiescent A.C. emitter impedance of amplifier 45. The base of transistor 45 connects to voltage source —20 v. through a high impedance 54.

The operating potentials applied to this transistor and the high impedance in its emitter circuit establish a quiescent operating condition of low gain and low D.C. collector current but it is desirable to have the transistor exhibit high gain and high collector current during stereophonic reproduction. This is accomplished by a feedback circuit coupling demodulation signal source 40, 41 with the input of amplifier 45 to constitute therewith a regenerative circuit. This feedback circuit has means, responsive to the translation of the pilot tone in the pilot-tone chain, for effectively reducing the impedance of the emitter circuit of transistor 45 to change its operating condition during stereophonic reception. More specifically, the feedback circuit includes impedance 43 across which a potential of negative polarity is developed during operating intervals in which frequency doubler 40, 41 is driven by the pilot tone. The high potential terminal of resistor 43 connects through a resistor 55 to the base of a transistor 56. A shunt capacitor 57, in conjunction with resistor 55, forms a filter network which applies a substantially D.C. potential from the frequency doubler to the base of transistor 56. The collector and emitter electrodes of transistor 56 are connected directly in shunt to resistor 48 in the emitter circuit of transistor 45. Transistor 56 is normally non-conductive but may be rendered conductive in responsive to the operation of frequency doubler 40, 41.

The demodulation signal from frequency doubler 40, 41 is used in a suppressed carrier detector employing a single transistor 60. If that transistor be of the symmetrical type, having a base and two other electrodes which serve equally well and in alternation as emitter and collector, the demodulator is then essentially the same as that shown in FIGURE 2 of De Vries Patent 3,129,288. However, the use of a non-symmetrical transistor as a suppressed-carrier detector in a stereophonic FM receiver is described and claimed in copending applications Serial No. 331,340, filed December 12, 1963, now Patent No. 3,151,218 and Serial No. 282,325 filed May 22, 1963, now Patent No. 3,151,217, both of which are assigned to the same assignee as the present invention. It is the non-symmetrical type detector that is indicated in FIGURE 1.

The collector-emitter circuit comprises load resistors 61, 62 and the secondary winding of a transformer 63. That winding is center tapped and coupled to ground through a resistor 64 by-passed at the subcarrier frequency by a capacitor 65. The signal output of detector 13, particularly the suppressed-carrier modulated component thereof, is applied to the base electrode of transistor 60 through input amplifier 25. For this reason, a connection is made from a tap of tuned circuit 28 through a coupling capacitor 66 to the base of transistor 60. A bias potential is applied to the same electrode through its connection between resistors 67 and 68 which form a voltage divider across potential source —20 v. The detected output from resistor 61 is applied through a resistor 69 and an RC network 70 serving to accomplish de-emphasis to the input of a B amplifier 71 which drives a loudspeaker 72. Similarly, the output taken from resistor 62 is supplied over a resistor 73 and a de-emphasis network 74 to an A amplifier 75 driving a second speaker 76, the speakers, of course, being arranged spacially to establish a stereophonic sound pattern.

As previously indicated, it is necessary to apply a demodulation signal from frequency doubler 40, 41 to the detector 60 and to that end the high potential terminal of resistor 43 of the doubler couples through a resistor 80 to the base electrode of a transistor 81. The emitter of this transistor is grounded through a resistor 82 by-passed at the subcarrier frequency by a capacitor 83 and the collector includes the tuned primary of transformer 63. Transistor 81 is normally non-conducting but when rendered conductive, delivers the demodulation signal from frequency doubler 40, 41 to the collector and emitter electrodes of transistor 60 in push-pull relation through transformer 63. Transistor 81 may be rendered conductive through the application of an energizing voltage which becomes available when a pilot indicator 90 is energized. The high potential terminal of the indicator connects to a tap on the tuned primary of transformer 63 through a resistor 94.

Pilot lamp 90 is in the collector circuit of a transistor 95 having its emitter directly coupled to voltage source —20 v. This source also couples to the collector through a resistor 96. A blocking potential is normally present on the base electrode of transistor 95 by virtue of the connection from potential source —25 v. through resistor 50 and resistor 97. Of course, capacitor 98 is an A.C. signal by-pass.

During active intervals of the pilot chain when the receiver is responding to a stereophonic program, the demodulation which takes place in transistor 60 develops the difference or $(A-B)$ information across each of load resistors 61 and 62. Matrixing of the sum or $(A+B)$ information with the demodulation components accomplishes separation of the $A+B$ signals as is well understood in the art. Matrixing is achieved by a connection from the junction of resistors 29 and 30 in the collector circuit of transistor 25 through a coupling capacitor 100 to the tap on the secondary of transformer 63. It is necessary, of course, properly to proportion resistors 29 and 30 to accomplish optimum matrixing.

In considering the operation of the described receiver, it will be assumed initially that there is no stereophonic program being received and, therefore, the pilot chain is in its quiescent state. Since the gain of transistor 45 is a function of the effective A.C. impedance of its emitter circuit, in this quiescent state the transistor exhibits low gain. For this condition the A.C. impedance in the emitter circuit is resistor 48 (which may have a value of 10,000 ohms) in parallel with the series combination of resistor 51 (about 1,500 ohms) and by-pass capacitor 53. The low gain characteristic is desirable because it protects the pilot chain against false actuation or triggering in response to noise, particularly noise that may reach amplifier 25 as the receiver is tuned over its band. A second distinct advantage of this quiescent gain condition is that the circuit of transistor 45 has little, if any, significant loading effect on tuned impedance 28 in the collector circuit of amplifier 25. The tuned circuit is essentially self loaded and is unloaded at least so far as the circuit of transistor 45 is concerned. As a consequence, the input amplifier 25 exhibits maximum selectivity which is also highly desirable. Of course, the pilot indicator 90 is extinguished, frequency doubler 40, 41 is not energized and transistors 56, 60, 81 and 95 are non-conductive.

If during this state a monaural signal is received, it is translated in conventional manner from receiving antenna 11 to detector 13 wherein its modulation components are derived. The detected modulation signal components after amplification by transistor 25 are applied through coupling capacitor 100, load resistor 61, 62 of transistor 60 and the de-emphasis networks 71, 74 to amplifiers 71 and 75 simultaneously. This results in conventional monaural signal reproduction and while it is taking place, the pilot chain of the receiver remains in its quiescent condition.

Because of the high selectivity of circuit 28 if the monaural FM service accommodates subscribers and includes a squelch tone close to the pilot frequency, that tone has no significant effect on the pilot chain. It is adequately discriminated against by the selectivity or high Q of the circuits, including circuit 28, which are tuned to the pilot or subcarrier frequencies.

If the received program is an FM stereophonic broadcast, the output of detector 13 corresponds with the complex modulation function of that broadcast discussed hereinabove. The output signal is again translated by input transistor 25 and the pilot tone selected by tuned circuit 28 is applied to variable gain amplifier 45. There is sufficient gain in this amplifier to translate the 19 kc. tone through transformer 42 to frequency doubler 40, 41 resulting in frequency doubling and a potential of negative polarity is developed across resistor 43. That potential is applied to the base of transistor 56 and causes this transistor to be conductive, whereas normally in the quiescent operating state this transistor is non-conductive. At the time transistor 56 conducts its cathode-emitter circuit, being in shunt relation to the emitter impedance of transistor 45, effectively reduces the emitter A.C. impedance and increases its gain. This is regenerative feedback which continues and, in conjunction with the pilot tone, drives transistor 45 into saturation. Voltage limiting occurs in its collector circuit when the D.C. voltage drop across resistor 50 plus the peak voltage of the pilot tone at the collector equals the supply voltage. In this connection it is to be pointed out that while the D.C. collector current of transistor 45 is low during quiescent intervals because of resistor 48, it is large during stereo reception when resistor 48 is shunted by the low collector-emitter impedance of transistor 56. Limiting is desirable in that it stabilizes the performance of the pilot-tone chain.

At the time the pilot tone is initially received, there is a net delay bias on the base electrode of transistor 95 because of sources —20 v. and —25 v. When voltage limiting is attained in the collector circuit of transistor 45, the delay bias of transistor 95 is overcome and that transistor is rendered conductive and driven to saturation. This applies essentially the entire —20 v. supply to pilot indicator 90 which is then energized to indicate stereophonic reception. The delay bias which has thus been overcome in energizing transistor 95 affords further protection against the adverse effect to unwanted signal transients and noise that may make its way to the input of the pilot chain.

With pilot indicator 90 energized, sufficient collector voltage is applied to transistor 81 to cause it to become conductive and deliver a demodulation signal which actually is the pilot tone doubled in frequency to the collector and emitter electrodes of transistor 60 in push-pull relation. Simultaneously, a composite modulation signal that has been applied from detector 13 to the input amplifier 25 is delivered through capacitor 66 to the base of transistor 60. In the presence of these signals demodulation occurs and the difference or $(A-B)$ information is developed across resistors 61, 62. This, of course, assumes that the necessary impedance relations described in the application, Serial No. 331,340, have been satisfied. Matrixing by the application of the sum or $(A+B)$ information from the load circuit of amplifier 25 through capacitor 100 accomplishes separation with the A audio signal developed in load circuit 62, de-emphasized in network 74 and supplied to amplifier 75. The B signal is derived at load 61, de-emphasized in network 70 and applied to amplifier 71. In this fashion, stereophonic reproduction is attained. Throughout the stereophonic reproduction, pilot lamp 90 is energized.

If a bilateral PNP transistor is used for detector 60,

D.C. coupling may be employed for the matrix signal and also for applying the suppressed-carrier amplitude-modulated signal to the detector permitting coupling capacitors 66 and 100 to be eliminated.

At the time the regenerative effect has saturated transistor 56, the amplifier including transistor 45 exhibits maximum gain because transistor 56 has its greatest shunting effect relative to its emitter impedance. In short, variable gain amplifier 45 is controlled to change from a low gain which it exhibits during quiescent operating conditions to an exceedingly high gain in the presence of a received stereophonic broadcast. In terms of selectivity, the pilot chain has also undergone a change from maximum selectivity during quiescent conditions to a reduced selectivity during operating intervals in which transistor 45 has maximum gain. The change in selectivity occurs in the right sense, namely, there is high selectivity during quiescent conditions which is desirable as explained above. There is less need for selectivity when the stereophonic signal has been intercepted and has activated the pilot chain. In similar fashion, the sensitivity of the pilot chain is changed. It is less sensitive in its quiescent state which affords protection against noise and is very sensitive or exhibits high gain during stereophonic reproduction. The regenerative circuit is fast acting and the circuit performs with the desirable attributes heretofore attained only with vacuum tube versions of the pilot change.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. In a frequency-modulation receiver for utilizing a monaural signal or a stereophonic signal which includes a pilot tone of a predetermined frequency, a pilot-tone chain comprising:

an input amplifier tuned to said pilot tone;

a signal source responsive to said tone for deriving a signal for demodulating said stereophonic signal;

a variable-gain transistor amplifier having an emitter circuit and coupling said source to said input amplifier;

a high impedance included in said emitter circuit establishing a low-gain quiescent operating condition for said variable-gain amplifier in the presence of said monaural signal;

a feedback circuit coupling said source to the input of said variable-gain amplifier to constitute therewith a regenerative circuit;

and means in said feedback circuit and responsive to the translation of said tone for effectively reducing the impedance of said emitter circuit to change the operating condition of said variable-gain amplifier from said low-gain quiescent state to a condition of high gain in the presence of said stereophonic signal.

2. In a frequency-modulation receiver for utilizing a monaural signal or a stereophonic signal which includes a pilot tone of a predetermined frequency, a pilot-tone chain comprising:

an input amplifier having a load impedance tuned to said pilot tone;

a signal source responsive to said tone for deriving a signal for demodulating said stereophonic signal;

a variable-gain transistor amplifier having an emitter circuit and coupling said source to said load impedance of said input amplifier;

a high impedance included in said emitter circuit establishing a quiescent operating condition for said variable-gain amplifier in the presence of said monaural signal characterized by low gain and minimal loading on said input amplifier;

a feedback circuit coupling said source to the input of said variable-gain amplifier to constitute therewith a regenerative circuit;

and means in said feedback circuit and responsive to the translation of said tone for effectively reducing the impedance of said emitter circuit to change the operating condition of said variable-gain amplifier from said low-gain quiescent state to a condition of high gain in the presence of said stereophonic signal.

3. In a frequency-modulation receiver for utilizing a monaural signal or a stereophonic signal which includes a pilot tone of a predetermined frequency, a pilot-tone chain comprising:

an input amplifier having a load impedance tuned to said pilot tone;

a signal source responsive to said tone for deriving a signal for demodulating said stereophonic signal;

a variable-gain transistor amplifier having an emitter-base circuit inductively coupled to said input amplifier and having a collector circuit coupled to said source;

a high impedance included in said emitter circuit establishing a quiescent operating condition for said variable-gain amplifier in the presence of said monaural signal characterized by low gain and minimal loading on said input amplifier;

a feedback circuit coupling said source to the input of said variable-gain amplifier to constitute therewith a regenerative circuit;

and means in said feedback circuit and responsive to the translation of said tone for effectively reducing the impedance of said emitter circuit to change the operating condition of said variable-gain amplifier from said low-gain quiescent state to a condition of high gain in the presence of said stereophonic signal.

4. In a frequency-modulation receiver for utilizing a monaural signal or a stereophonic signal which includes a pilot tone of a predetermined frequency, a pilot-tone chain comprising:

an input amplifier having a load impedance tuned to said pilot tone;

a signal source responsive to said tone for deriving a signal for demodulating said stereophonic signal;

a variable-gain transistor amplifier having an emitter-base circuit inductively coupled to said input amplifier and having a collector circuit coupled to said source;

a high impedance included in said emitter circuit establishing a quiescent operating condition for said variable-gain amplifier in the presence of said monaural signal characterized by low gain and minimal loading on said input amplifier;

a feedback circuit coupling said source to the input of said variable-gain amplifier to constitute therewith a regenerative circuit;

and means in said feedback circuit and responsive to the translation of said tone for effectively reducing the impedance of said emitter circuit to change the operating condition of said variable-gain amplifier from said low-gain quiescent state to a condition of high gain and a high degree of current saturation in said collector circuit in the presence of said stereophonic signal.

5. In a frequency-modulation receiver for utilizing a monaural signal or a stereophonic signal which includes a pilot tone of a predetermined frequency, a pilot-tone chain comprising:

an input amplifier having a load impedance tuned to said pilot tone;

a signal source responsive to said tone for deriving a signal for demodulating said stereophonic signal;
a variable-gain transistor amplifier having an emitter-base circuit inductively coupled to said input amplifier and having a collector circuit coupled to said source;
a high impedance included in said emitter circuit establishing a quiescent operating condition for said variable-gain amplifier in the presence of said monaural signal characterized by low gain and minimal loading on said input amplifier;
a feedback circuit coupling said source to the input of said variable-gain amplifier to constitute therewith a regenerative circuit;
and a second transistor, included in said feedback circuit and non-conductive in the presence of said monaural signal, having a collector-emitter circuit in shunt to said high impedance of said variable-gain amplifier and having a base electrode coupled to said signal source to derive therefrom, in the presence of said stereo signal, a potential for rendering said second transistor conductive to change the operating condition of said variable-gain amplifier from said low-gain quiescent state to a condition of high gain in the presence of said stereophonic signal.

6. In a frequency-modulation receiver for utilizing a monaural signal or a stereophonic signal which includes a pilot tone of a predetermined frequency, a pilot-tone chain comprising:
an input amplifier having a load impedance tuned to said pilot tone;
a signal source responsive to said tone for deriving a signal for demodulating said stereophonic signal having an amplitude determined by the amplitude of said tone as applied to said source;
a variable-gain transistor amplifier having an emitter-base circuit inductively coupled to said input amplifier and having a collector circuit coupled to said source;
a high impedance included in said emitter circuit establishing a quiescent operating condition for said variable-gain amplifier in the presence of said monaural signal characterized by low gain and minimal loading on said input amplifier;
a feedback circuit coupling said source to the input of said variable-gain amplifier to constitute therewith a regenerative circuit;
and a second transistor, included in said feedback circuit and non conductive in the presence of said monaural, having a collector-emitter circuit in shunt to said high impedance of said variable-gain amplifier and having a base electrode coupled to said signal source to derive therefrom, in the presence of said stereo signal, a potential for establishing a condition of current saturation in said second transistor to change the operating condition of said variable-gain amplifier from said low-gain quiescent state to a condition of high gain in the presence of said stereophonic signal.

7. In a frequency-modulation receiver for utilizing a monaural signal or a stereophonic signal which includes a pilot tone of a predetermined frequency, a pilot-tone chain comprising:
an input amplifier having a load impedance tuned to said pilot tone;
a signal source responsive to said tone for deriving a signal for demodulating said stereophonic signal having an amplitude determined by the amplitude of said tone as applied to said source;
a variable-gain transistor amplifier having an emitter-base circuit inductively coupled to said input amplifier and having a collector circuit coupled to said source;
a high impedance included in said emitter circuit establishing a quiescent operating condition for said variable-gain amplifier in the presence of said monaural signal characterized by low gain and minimal loading on said input amplifier;
a feedback circuit coupling said source to the input of said variable-gain amplifier to constitute therewith a regenerative circuit;
and a second transistor, included in said feedback circuit and non conductive in the presence of said monaural, having collector and emitter electrodes connected directly in shunt to said high impedance of said variable-gain amplifier and having a base electrode coupled to said signal source to derive therefrom, in the presence of said stereo signal, a potential for establishing a condition of current saturation in said second transistor to change the operating condition of said variable-gain amplifier from said low-gain quiescent state to a condition of high gain in the presence of said stereophonic signal.

8. In a frequency-modulation receiver for utilizing a monaural signal or a stereophonic signal which includes a pilot tone of a predetermined frequency, a pilot-tone chain comprising:
an input amplifier having a load impedance tuned to said pilot tone;
a frequency doubler responsive to said tone for deriving a signal for demodulating said stereophonic signal having an amplitude determined by the amplitude of said tone as applied to said source;
a variable-gain transistor amplifier having an emitter-base circuit inductively coupled to said input amplifier and having a collector circuit coupled to said doubler;
a high impedance included in said emitter circuit establishing a quiescent operating condition for said variable-gain amplifier in the presence of said monaural signal characterized by low gain and minimal loading on said input amplifier;
a feedback circuit coupling said doubler to the input of said variable-gain amplifier to constitute therewith a regenerative circuit;
a second transistor, included in said feedback circuit and non condcutive in the presence of said monaural, having collector and emitter electrodes connected directly in shunt to said high impedance of said variable-gain amplifier and having a base electrode;
and a filter network coupling said base electrode to said doubler to derive therefrom and apply to said second transistor, in the presence of said stereo signal, a substantially D.C. potential for establishing a condition of current saturation in said second transistor to change the operating condition of said variable-gain amplifier from said low-gain quiescent state to a condition of high gain in the presence of said stereophonic signal.

References Cited by the Examiner

UNITED STATES PATENTS

| | | | |
|---|---|---|---|
| 3,124,653 | 3/1964 | Schroeder | 179—15 |
| 3,233,044 | 2/1966 | Hopper | 179—15 |

OTHER REFERENCES

Knight and Beckman, IRE Transactions, November 1961, pages 40–44 relied on.

DAVID G. REDINBAUGH, *Primary Examiner.*

R. L. GRIFFIN, *Examiner.*